(12) United States Patent
Maggiore

(10) Patent No.: US 9,505,173 B2
(45) Date of Patent: Nov. 29, 2016

(54) SINGLE-USE BIOLOGICAL 3 DIMENSIONAL PRINTER

(71) Applicant: Sartorius Stedim Biotech GmbH, Goettingen (DE)

(72) Inventor: Frank Maggiore, Port Jefferson Station, NY (US)

(73) Assignee: Sartorius Stedim Biotech GmbH (DE)

( * ) Notice: Subject to any disclaimer, the term of this patent is extended or adjusted under 35 U.S.C. 154(b) by 619 days.

(21) Appl. No.: 13/956,990

(22) Filed: Aug. 1, 2013

(65) Prior Publication Data

US 2015/0035206 A1 Feb. 5, 2015

(51) Int. Cl.
*B29C 67/00* (2006.01)

(52) U.S. Cl.
CPC ....... *B29C 67/0085* (2013.01); *B29C 67/0051* (2013.01); *B29C 67/0081* (2013.01); *B29C 2791/005* (2013.01)

(58) Field of Classification Search
CPC .................. B29C 2791/005; B29C 67/0051; B29C 67/0081

USPC .............. 264/241, 113; 425/174.4, 185, 112, 425/553, 289

See application file for complete search history.

(56) References Cited

U.S. PATENT DOCUMENTS

| | | | |
|---|---|---|---|
| 7,674,254 B2* | 3/2010 | Baumfalk | A61M 39/10 604/403 |
| 2004/0003738 A1* | 1/2004 | Imiolek | B22F 3/1055 101/480 |
| 2010/0221698 A1* | 9/2010 | Wei | G01N 35/028 435/4 |
| 2014/0268604 A1* | 9/2014 | Wicker | B29C 70/885 361/760 |

* cited by examiner

*Primary Examiner* — Alison L Hindenlang
*Assistant Examiner* — Lawrence D Hohenbrink, Jr.
(74) *Attorney, Agent, or Firm* — Gerald E. Hespos; Michael J. Porco; Matthew T. Hespos

(57) ABSTRACT

A three dimensional printing device has a sterilizable printer assembly including at least one printing head, a printing platform, and a driving mechanism adapted to perform a movement of the at least one printing head relative to the printing platform along three degrees of freedom; a printer housing enclosing the printer assembly in a sterile manner, at least one aseptic connector fluidly connected to a corresponding one of the at least one printing head.

46 Claims, 14 Drawing Sheets

SINGLE-USE BIOLOGICAL 3 DIMENSIONAL PRITNER

BACKGROUND

1. Field of the Invention

The invention relates to a three dimensional printing device, a printing system and a printing method.

2. Description of the Related Art

The forming of three dimensional objects or the coating of three dimensional objects under sterile conditions, particularly a coating with biochemical materials requires high effort to uphold the sterile conditions and to assemble the required apparatuses for forming or coating under sterile conditions.

Thus, it is a problem to provide a printing device, a printing system and a printing method which are capable to form or coat a material under sterile conditions in a reliable and easy manner.

SUMMARY OF THE INVENTION

One aspect of the invention relates to a three dimensional printing device comprising a sterilizable printer assembly including at least one printing head, a printing platform, and a driving mechanism adapted to achieve a relative displacement between the at least one printing head and the printing platform along two or three degrees of freedom. A printer housing encloses the printer assembly in a sterile manner, and at least one aseptic connector is fluidly connected to a corresponding one of the at least one printing head.

The printer assembly is intended for single-use applications, and thus is disposable after use. Preferably, the a three dimensional printing device is disposable including the printer housing after single use. The printer housing can comprise a rigid or flexible wall, and is preferably made of a sterilizable material.

The printer assembly is sterile or sterilizable, e.g. by gamma-irradiation, autoclaving, or chemical sterilant such as ethylene oxide or vaporized hydrogen peroxide.

The printer assembly may comprise a single printing head or a plurality of printing heads. Each of the printing heads can utilize a specific technique of additive manufacturing such as extrusion, fused deposition modeling, heated extrusion, spray deposition, granular material binding, photopolymerization, etc. The printing heads are adapted for the deposition of the materials onto a printing platform or printing tray or any object located thereon. A three dimensional computed aided design (CAD) file can be utilized to serve as the instructions for building the three dimensional printed structure. By depositing the appropriate printing material three dimensional objects may be created or formed. Other appropriate printing material may be used for coat two dimensional or three dimensional objects.

In order to print the three dimensional object, it can be sufficient to allow a relative displacement between the at least one printing head and the printing platform along two degrees of freedom, wherein the third dimension of the object is created during by depositing printing material. A displacement of the printing platform and the at least one printing head along three degrees of freedom is an option. In order to obtain the relative displacement the at least one printing head or the printing platform can be moved. Particularly, the driving mechanism is adapted to perform a movement of the at least one printing head relative to the printing platform along two or three degrees of freedom. Alternatively, the driving mechanism is adapted to perform a movement of the printing platform relative to the at least one printing head along two or three degrees of freedom.

A finishing head can be utilized to subtractively remove material from the three dimensional object after the additive manufacturing steps have been completed. Debris generated from the subtractive process can be flushed into a debris tray with a fluid media and filtered out during a recirculation of the fluid within the debris tray.

Optionally, the aseptic connector of the three dimensional printer comprises a single-use aseptic connector, where a sterile connection and the sterile fluid transfer can occur between at least two connected complementary aseptic connectors. The aseptic connector can additionally comprise a thermoplastic tubing, which can be heat-connected in a sterile manner to a complementary aseptic connector. The heat-connection can be performed by at least one of welding, ultrasonic welding, partial melting and gluing with a thermoplastic glue.

Optionally, the internal volume of the printer housing is fluidly connected with the exterior by means of a venting filter. The venting filter may be a sterilizing grade vent filter in order to keep the interior of the printer housing in a sterile condition. The interior of the printer housing enclosing the printer assembly can be filled with a homogenous or heterogeneous gas mixture such as compressed air, nitrogen, carbon dioxide, or other mixtures and can be vented to the exterior utilizing a venting filter, preferably a sterilizing grade vent filter.

Optionally, the at least one printer head is in a fixed position and the printer platform can be moved along two or three degrees of freedom. A degree of freedom can be a movement along a linear axis or a rotation around a rotational axis. Thus, the three degrees of freedom may comprise three rotational axes or may comprise two rotational axes and one linear axis or may comprise one rotational axis and two linear axes or may comprise three linear axes. Preferably, the degrees of freedom are all linear axes, which are orthogonal to each other, and thus, the axes are defining a cartesian coordinate system.

Optionally, the at least one printer head of the three dimensional printer is in a fixed position and the printer platform can be moved along two or three axis framework. The printer platform may be moved along the axis framework utilizing a pneumatic actuator or a magnetic actuator.

Optionally, the pneumatic actuator comprises at least one bag or bladder, which is extendible in at least one direction by providing a fluid pressure to the inside of the at least one bag or bladder. In order to obtain a precise movement and positioning of the printing platform by means of the pneumatic actuator it may comprise a coarse bag and a fine bag, wherein the coarse bag is more extendible in at least one direction than the fine bag, when filled with an identical volume of a fluid or when the same internal fluid pressure is applied to the bags. Additionally, the printing platform can contain a plurality of coarse and fine bags which can be utilized to automatically level and calibrate the distance between the printing platform and the printer head in use.

As an option, the pneumatic actuator may comprise at least one fluid actuated motor which moves along a track or a threaded screw for positioning the printing platform along a corresponding axis. The fluid actuating the motor may comprise any gas or gas-liquid-mixture. Particularly, the fluid can comprise air, nitrogen, or any inert gas.

As a further option, the three dimensional printer can comprise a magnetic actuator comprising at least one magnetic drive mechanism, which is rotatable or linearly movable by a complementary external magnetic drive mechanism.

Optionally, the three dimensional printer comprises a position tracking system, also called precision tracking system, which is capable to determine the position of the printing platform relative to the at least one printing head along each of the three degrees of freedom. Thus, one or more of the coordinates of the printing platform within the three axis framework can be measured precisely by means of the tracking system. In order to obtain a maximum accuracy of positioning the printing platform along one or more of the framework axes a plurality of (magnetic or pneumatic) actuators can be utilized along the same axis of freedom. Particularly, two or more actuators may actuate a corresponding track or threaded screw in order to provide coarse to fine resolution for movement of the printing platform. A position controller may be provided to control and autocorrect the movement of the actuators to position the printing platform to the exact coordinates required for the deposition of material by the at least one printing head.

The tracking system can include a laser tracking system, comprising an external laser source arranged exterior to the three dimensional printer assembly, a mirror or reflective material on at least one portion of the printing platform, a laser detecting device, for detecting the time and angle of the reflected laser emission, and a computing system to calculate and report the coordinates of the printing platform relative to the at least one printing head.

Alternatively, the tracking device can comprise a plurality of cameras exterior to the three dimensional printer assembly, a visual target material on at least one portion of the printing platform, and a computing system to calculate and report the coordinates of the printing platform relative to the at least one printing head. The cameras may be macro cameras with high resolution, such as HDTV cameras or generally cameras having a horizontal resolution of 1000 pixels or more.

Optionally, the three dimensional printer comprises a transfer hatch adapted for removing the printing platform containing the three dimensional printed object. By means of the transfer hatch objects may be transferred from or into the printer housing in a sterile manner. Thus, the transfer hatch may be formed in the wall of the printer housing. Preferably, the transfer hatch is aseptically connectable to a sterile transfer bag allowing for the printing platform containing the three dimensional printed object to maintain sterility during transfer of the printed object.

Optionally, the three dimensional printer can comprise a membrane dispenser for dispensing a roll or sheets of membrane and which are printable on by means of the printing assembly. By means of the at least one printing head the membranes can be printed with proteins, antibodies, molecules, structural scaffolding or other printing materials. These printing materials might be stored in a tank located in the corresponding printing head within the sterile printer housing or might be provided from an external printing material source via a fluid line. The fluid line can be permanent fixed to the belonging printing head, particularly to keep the printing material and/or the printing head sterile. Alternatively, the fluid line can be removably connected to the belonging printing head, e.g. by a sterile connector.

The membrane dispenser can be driven pneumatically or magnetically. In order to be able to manufacture membrane of different sizes and shapes, the three dimensional printer might further comprising a membrane cutter for cutting the roll or sheets of membrane into strips, sections, shapes, or pieces. The membrane cutter might be passive or active. A passive membrane cutter can comprise one or more fixed blade(s), thus utilizing the dispensing of the membrane roll to cut the membrane into strips utilizing the static blade(s) or a cutting die. An active membrane cutter can comprise one or more movable or rotatable blade(s), and thus, utilizing a mechanical motion of the blade(s) to cut the membrane, wherein the blades might be driven by a pneumatic actuator or an external magnetic drive mechanism.

Optionally, the three dimensional printer further comprises a collection device for collecting the strips, sections, shapes, or pieces cut from the membrane, wherein the collection device can be moveable along the three axis framework in order to collect the strips etc. at different locations within the printer housing.

Depending on the printing materials, which are printed by means of the at least one printing head, it is required to support the fixation of the printing material. E.g. it might be required for printing material dissolved in aqueous solutions to support the drying process by providing dry air and/or hot air and thermoplastic material might require a cooling, particularly by blowing cool air to the printed material. Therefore, the three dimensional printer might comprise a drying device for drying the three dimensional printed object. Particularly, the drying device can comprise a dry air vent for providing air from an external air supply device. As an option, the dry air vent can comprise a sterilizing grade vent filter for filtering the incoming air to keep the interior of the printer housing sterile.

The hot air or cool air may be provided by an external device and flows through the vent into the interior of the printer housing, particularly to the printing platform. The three dimensional printer may comprise a dispersal mechanism to evenly distribute the hot air or the cold air over the area of the printing platform, especially over the membrane, in order to dry the printed material onto the membrane. The three dimensional printer may alternatively or additionally comprise a heating or cooling device being a disposable single-use device attached to the printer housing or included by the printer housing.

In order to keep a more or less constant pressure inside the printer housing, the excessive air from the dry air vent might be released into the exterior of the printer housing by means of a vent, particularly, a sterile vent. Correspondingly, waste air from the pneumatic actuators may be released into the printer body housing which is maintained at ambient pressure using the vent. The vent may also act as an air pressure regulating device keeping the interior of the printer housing at ambient pressure or at a predetermined underpressure or overpressure.

In order to keep the temperature inside the printer housing more or less constant at least a part of the printer housing can be formed as a thermal insulation or jacketing. The thermal insulation or jacketing can contain thermal barrier layers to prevent the transfer of heat or comprise tubing or capillaries for pumping a fluid through the insulation for the purposes of maintaining a constant temperature within the three dimensional printer.

The three dimensional printer may also comprise a temperature regulation device for maintaining a constant temperature within the printer housing. A temperature regulating device can measure the internal temperature of the three dimensional printing assembly inside the printer housing and either heat or cool a fluid flowing into the printer housing via the in the printer housing to provide temperature regulation and/or incubation of the printed material.

The printing platform may be formed as a printing tray or may include a tray, which is fillable with a liquid, preferably a nutrient rich liquid, for supplying living cells with an environment for growth during the printing process. The fluid in the tray can be recirculated, mixed, filtered, or drained and replaced according to the requirements of the printed structure.

Optionally an electric charge is providable by the printing platform or at least one printing head. Therefore, each of the at least one printing head(s) and/or the printing platform can comprise an electrode, in order to produce and distribute the small electric charge. A regulated electric charge can be utilized to stimulate cells located on the printing platform, particularly in a tray, during organ growth, incubation, or development.

Optionally, the three dimensional printer may comprise a leveling device for horizontal leveling of the printing platform. By means of the leveling device it can be ensured that the three dimensional printer and its printing platform or tray are leveled during the printing process. The leveling device can additionally be used to automatically calibrate the distance between the printing platform and the printer head in use.

The invention also relates to a printing system with a three dimensional printing device comprising a sterilizable printer assembly including at least one printing head, a printing platform, and a driving mechanism adapted to achieve a relative displacement between the at least one printing head and the printing platform along two or three degrees of freedom.

A printer housing encloses the printer assembly in a sterile manner, and at least one aseptic connector fluidly connected to a corresponding one of the at least one printing head. The printing system also has a control device comprising a complementary driving mechanism adapted to drive a corresponding one of the driving mechanism of the three dimensional printing device, at least one sterile printing material container fluidly connected with a corresponding one of the at least one aseptic connector and a controller for controlling the movement of the at least one printing head by means of the complementary driving mechanism and for controlling the ejection of the printing material by means of the at least one printing head.

Optionally, the complementary driving mechanism for moving the at least one printing head comprises a complementary magnetic actuator.

Optionally, the complementary magnetic actuator comprises an external motor driving a shaft to which a plurality of magnets is attached. It has to be understood, that a plurality of complementary magnetic actuators may be provided for each degree of freedom or movable axis. Each complementary magnetic actuator may utilize an external motor, preferably a stepper motor, containing a shaft and head with a plurality of magnets. The magnets can be ferrous magnets (such as iron), rare earth magnets (such as Neodymium), superconducting magnets, or magnetic fluids (ferrofluids). At least one magnetic head can mate directly or indirectly with an internal magnetic head of the magnetic actuator being internal and containing a plurality of magnets utilizing a bearing system or rigid wall separation. When the external motor rotates the magnetic connection between the external or internal magnets turns the internal magnetic head which in turn drives the corresponding printing head relative to the printing platform along one degrees of freedom. The driving can be performed by an internal threaded screw which is utilized to precisely move the printing platform along a track and or threaded screw within a three axis framework. This movement of the printing platform tray can be measured precisely with a tracking system. The system can auto-correct the position the printing platform by movement of the external magnetic drive mechanism to the exact coordinates required for the deposition of material by the printing device.

Optionally, the complementary driving mechanism for moving the at least one printing head comprises a controllable pneumatic source. The controllable pneumatic source is preferably an automated integrity testing device. In order to provide only a single controllable pneumatic source, this pneumatic source can be connected to a pneumatic manifold or a pneumatic multiplexer in order to sequentially fluidly connect a single one of a plurality of complementary driving mechanisms to the controllable pneumatic source. The three dimensional printer, wherein an automated integrity testing device, preferably a Sartocheck® bag integrity testing device with a fine resolution pressure transducer, can be utilized as a measuring and pressure source for the pneumatic driving mechanism, such as a bag or bladder inflation mechanism, for positioning the printing platform/tray to the exact coordinates required for the deposition of printing material by the at least one printing head.

The manifold device linking the tubing from the three dimensional printer to the measured pressure source can be controlled by the automated integrity testing device or an external device. The manifold device may link the tubing from the three dimensional printer to the measured pressure source, which can be controlled by the automated integrity testing device or an external device. An electronic control section of manifold device which can be re-used can be externally attached to the sterile section of the manifold device which can be single-use.

Optionally, the printing system comprises a position tracking system, which is capable to determine the position of the printing platform relative to the at least one printing head along each of the three degrees of freedom. The position tracking system is connected to the controller for correcting position of the printing platform to the predetermined coordinates required for the deposition of the printing material by the at least one printing head. The position tracking system is capable to determine the position of the printing platform relative to the at least one printing head along each of the three degrees of freedom. The controller of the printing system can control the driving mechanism, e.g. auto-correct the inflation of the bags, in order to position the printing platform to the exact coordinates required for the deposition of printing material by the printing head.

Optionally, the printing system's three dimensional printer further comprises a membrane cutter for cutting the roll or sheets of membrane into strips, sections, shapes, or pieces driven by a pneumatic actuator or an external magnetic drive mechanism controlled by the controller.

Optionally, the printing system's three dimensional printer further comprises a drying device for drying the three dimensional printed object, wherein the drying device includes an air supply device located outside the printer housing providing air through a vent in the printer housing towards the printing platform. The printing material can be dried utilizing a forced hot air or forced cold air provided by the air supply device through the vent, preferably through a sterilizing grade vent filter for filtering the air flowing into the printer housing. A heating or cooling device can take hot or cold air processed from an external device and can input it into the three dimensional printing assembly. The heating or cooling device can contain a dispersal mechanism to evenly distribute the hot or cold air over the printing platform or a printed object, such as a membrane, to dry the printed material, e.g. onto the membrane. The heating or cooling device can be a disposable single-use device.

Optionally, the aseptic connector of the three dimensional printer is fluidly connected to a feed or processing source including at least one of a bioreactor, a fermenter, a filtration train, a cross flow assembly, a membrane adsorber, a column, a centrifugation apparatus, a continuous centrifugation apparatus, an incubator, or other bioprocessing assemblies. The filtration train may include depth filters, pre-filters, sterilizing grade filters, ultra-filters, virus filters, etc. The cross flow assembly may include microfiltration or ultra-filtration cassettes.

The invention further relates to a printing method including the step of providing a three dimensional printing device comprising a sterilizable printer assembly including at least one printing head, a printing platform, and a driving mechanism adapted to achieve a relative displacement between the at least one printing head and the printing platform along two or three degrees of freedom. A printer housing encloses the printer assembly in a sterile manner, and at least one aseptic connector fluidly connected to a corresponding one of the at least one printing head. The method proceeds by connecting at least one sterile printing material container fluidly with a corresponding one of the at least one aseptic connector, moving the at least one printing head by means of a complementary driving mechanism coupled to the driving mechanism and ejecting printing material by means of the at least one printing head for printing the printing material onto the printing platform or onto an object located on the printing platform under sterile conditions.

In case the printer assembly is not in a sterile condition that printing method may including the step of sterilizing the printer assembly. The sterilization may be carried out by using gamma-irradiation, autoclaving, or a chemical sterilant such as ethylene oxide or vaporized hydrogen peroxide.

Additional objects, advantages and features of the present invention will now be described in greater detail, by way of example, with reference to preferred embodiments depicted in the drawings.

DETAILED DESCRIPTION OF THE PREFERRED EMBODIMENTS

Figure 1:
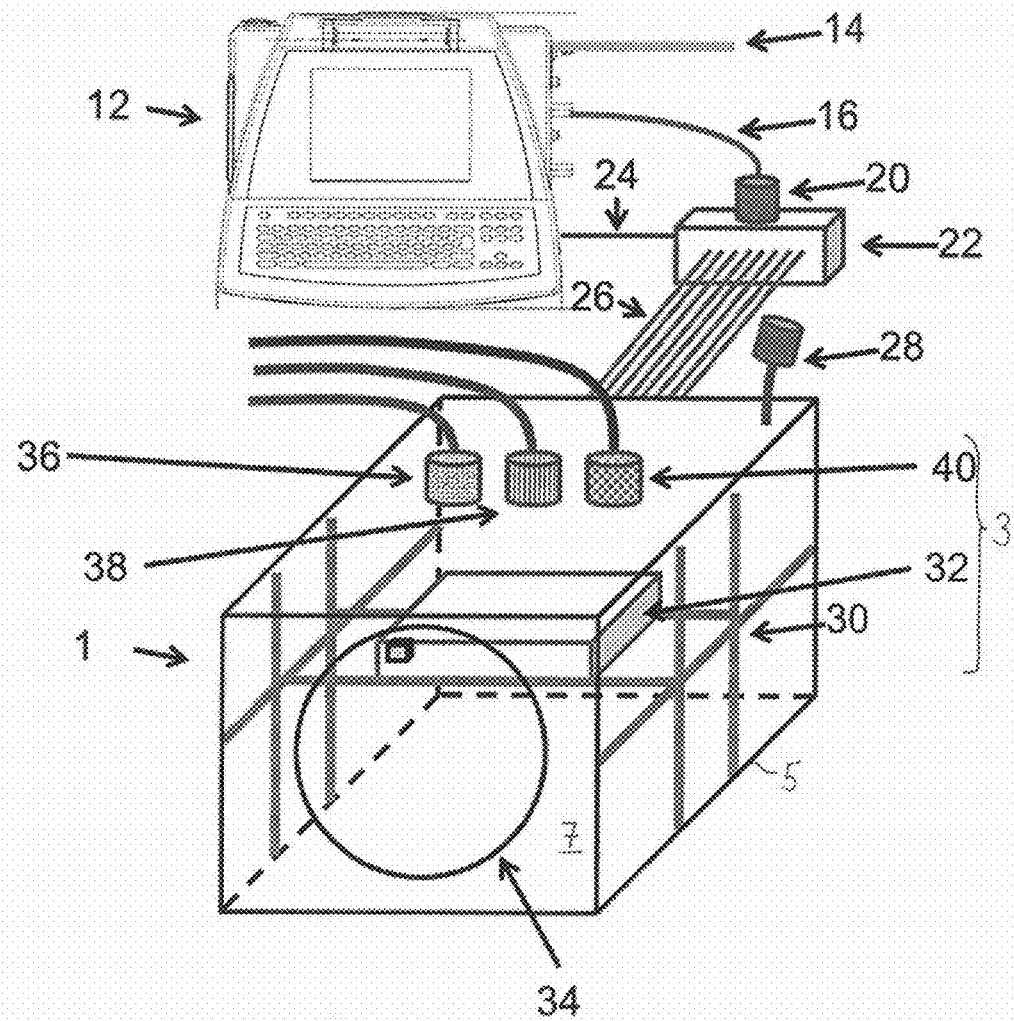
FIG. 1 illustrates an embodiment of a sterile, single-use three dimensional printer utilizing a highly regulated pressure source and an electronically controlled tubing manifold to control the movement of a 3 axis tray.

FIG. 1 shows a three dimensional printing device 1 comprising a printer housing 5 enclosing a printer assembly 3. The inside of the printer housing 5, particularly the printer assembly 3, is sterilizable and disposable, i.e. intended for single use. The printer housing 5 can be formed of rigid walls or flexible walls 7 held open by a rigid internal and/or external skeleton.

The three dimensional printing device 1, particularly the printer assembly 3 and/or the inside of the printer housing 5, can be sterilized by gamma-irradiation, autoclaving, or chemical sterilant (such as ethylene oxide or vaporized hydrogen peroxide). The electronic and controlling components for controlling the printer assembly 3 that are reused or that are sensitive to the sterilization method can be arranged outside the printer housing 5 and might be removably attached to the sterilized three dimensional printer 1 during setup.

The at least one printing head of the three dimensional printing device can positioned along three grades of freedom, such as the three axes x, y, and z, by means of a pressurized fluid, which can be provided by a fluid source. As an example, compressed air might be used as pressurized fluid. A regulated fluid source, which drives a three axis controller for the three dimensional printer can be controlled by an automated integrity testing device 12 which takes air pressure from an incoming source and uses a sensitive, calibrated pressure transducer to accurately measure and dispense a precise pressure of fluid, such as air, to an outlet connection 16.

The outlet connection 16 can be connected to a sterilizing grade filter 20 which feeds an electronically controlled tubing manifold 22. The tubing manifold physically open and closes the connections to all of the air pressure tubing lines 26 which feed the three dimensional printer 1 and is controlled by an electronic connection 24 to the controlling device 12. The tubing manifold 22 and vent filter 20 unit can be sterilizable along with the three dimensional printer 1 as a single piece and have an external electronically controlled device (not shown) that can be attachable to the tubing manifold 22 to control the opening and closing of each of the air pressure tubing lines 26. The tubing lines 26 can deliver fluid pressure and be individually attached to fluid actuator, such as air actuators or inflatable bags or bladders, which can be utilized to move a printing tray 32 on a three axis framework 30. The tubing manifold 22 can also individually vent each of the tubing lines 26 to remove air pressure in the inflatable bag/bladder or the air actuators. The three dimensional printer is vented by a sterilizing grade air filter 28 so the internal pressure is always maintained at ambient. The printing tray 32 is push or pulled along the three axis framework 30 which can consist of threaded screws or tracks by the fluid actuators.

The printing tray 32 can be a flat platform or have walls which can hold a fluid during the printing process. The three dimensional printer 1 can feature a plurality of fixed or movable printing heads with different functionality. In this embodiment the printer heads are fixed and features a spray deposition printer head 36 for coating the three dimensional printed object with proteins, chemicals or molecules, a solid extruder printer head 38 for deposition of cells and other materials from a bioreactor, and a heated solid extruder head 40 for the deposition of structural elements. After the printing onto the tray has been completed the tray and printed structure can be removed via a transfer hatch 34 on the three dimensional printer 1 wall. A sterile transfer bag (not shown) can be connected to the transfer hatch 34 where the tray and three dimensional printed object can be removed and maintained within a sterile environment. The entire three dimensional printer assembly 1 can also be placed in an incubator if further printing steps are required with the same unit.

Figure 2:
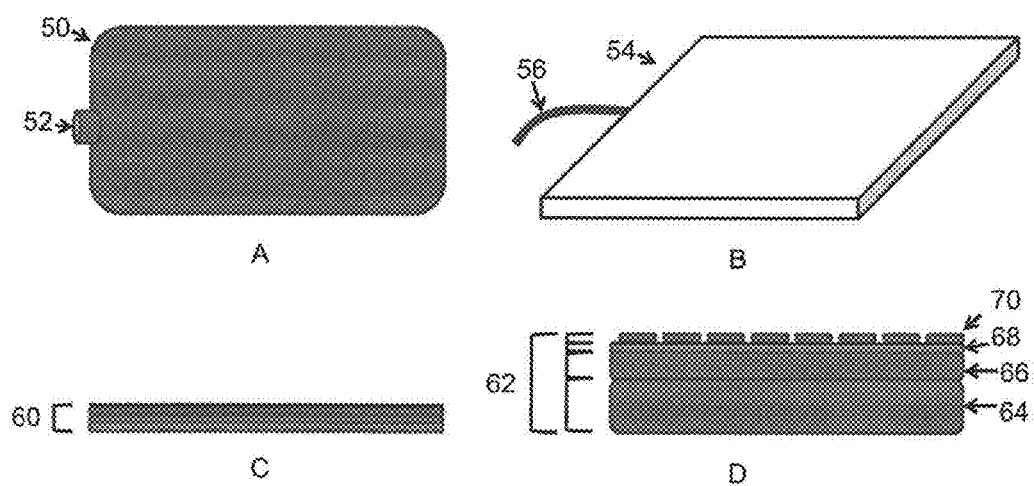
FIG. 2 illustrates an embodiment of inflatable bags/bladders utilized in a three dimensional printer for the purposes of moving a platform on a 3 axis framework.

FIG. 2 shows an embodiment of inflatable bags or bladders utilized in a three dimensional printer for the purpose of moving a platform on a three-axis framework.

View 'A' is a top view of a two dimensional bladder 50 which can be inflated and vented out of a port 52.

View 'B' is a side view of a three dimensional bag 54 which can be inflated and vented out of a port 56.

View 'C' is a side view of an assembly of three dimensional bags 60 which are in a deflated state.

View 'D' is a side view of an assembly of three dimensional bags 62 which are in an inflated state.

The individual three dimensional bags in the assembly go from larger sizes to smaller sizes and provide coarse to fine resolution for movement of a three dimensional printing platform. The bags 64 and 66 provide the coarse resolution for inflation while bags 68 and 70 provide fine resolution for inflation. These are in place to move the three dimensional printing platform into the correct position for the accurate deposition of printing materials within the specified coordinates.

Figure 3:
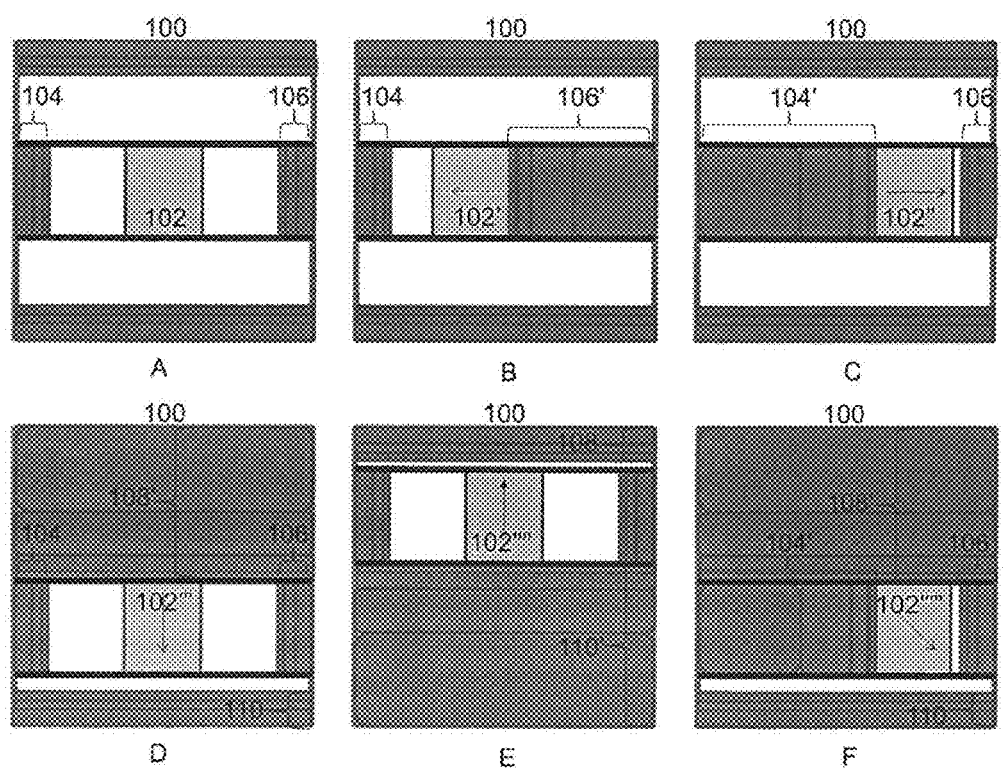
FIG. 3 illustrates an embodiment of the movements of the x-axis and z-axis controls of the three dimensional printing platform utilizing inflatable bags/bladders.

FIG. 3 shows an embodiment of the movements of the x-axis and z-axis controls of the three dimensional printing platform utilizing inflatable bags or bladders.

View 'A' is a top view of an embodiment of a three dimensional printing device having a printable space 100 where a three dimensional printing platform 102 in the following also called printer tray 102, as a preferred printing platform, is pushed into a precise position by the coarse and fine resolution of the inflatable bags or bladders. In this case the three dimensional printer tray 102 is in a centralized position and the bags 104 and 106 are in a deflated position.

View 'B' is a top view of the printable space 100 where a three dimensional printer tray 102', as a preferred printing platform, is pushed to a precise position to the left by the inflation of bag assembly 106'. Bag assembly 104 remains in a deflated position.

View 'C' is a top view of an embodiment of the printable space 100 where a three dimensional printer tray 102", as a preferred printing platform, is pushed to a precise position to the right by the inflation of bag assembly 104' and the deflation of bag assembly 106.

View 'D' is a top view of an embodiment of the printable space 100 where a three dimensional printer tray 102''', as a preferred printing platform, is pushed to a precise position forward by the inflation of bag assembly 108'. Bag assemblies 104, 106, and 110 remain in a deflated position.

View 'E' is a top view of an embodiment of the printable space 100 where a three dimensional printer tray 102'''', as a preferred printing platform, is pushed to a precise position backward by the inflation of bag assembly 110' and the deflation of bag assembly 108. Bag assemblies 104 and 106 remain in a deflated position.

View 'F' is a top view of an embodiment of the printable space 100 where a three dimensional printer tray 102''''', as a preferred printing platform, is pushed to a precise position in the forward right direction by the inflation of bag assembly 108' in the forward direction and bag assembly 104' in the right direction. Bag assemblies 106 and 110 are in a deflated position.

Figure 4:
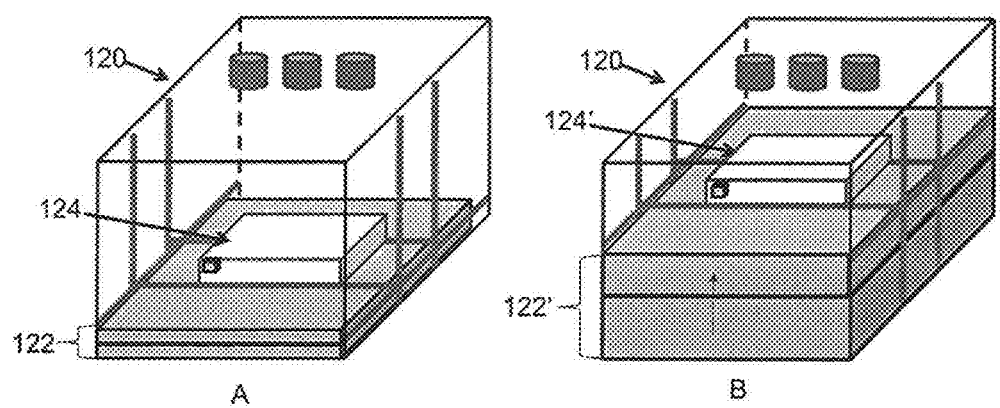
FIG. 4 illustrates an embodiment of the movements of the y-axis of the three dimensional printing platform utilizing inflatable bags/bladders.

FIG. 4 shows an embodiment of the movements of the y-axis of the three dimensional printing platform or printer tray 124 utilizing inflatable bags or bladders.

View 'A' is a side view of an embodiment of a three dimensional printer 120 where a three dimensional printer tray 124 is pushed into a precise position by the coarse and fine resolution of the inflatable bags or bladders. In this case the three dimensional printer tray 124 is in a centralized position and the bag assembly 122 is in a deflated position.

View 'B' is a side view of an embodiment of a three dimensional printer 120 where a three dimensional printing platform or printer tray 124' is pushed upwards into a precise position by the inflation of bag assembly 122'. The elevation of the tray by the inflation of bag assembly 122' also lifts the bag assemblies (not shown) utilized for the x-axis and z-axis controls on the three-axis framework.

Figure 5:
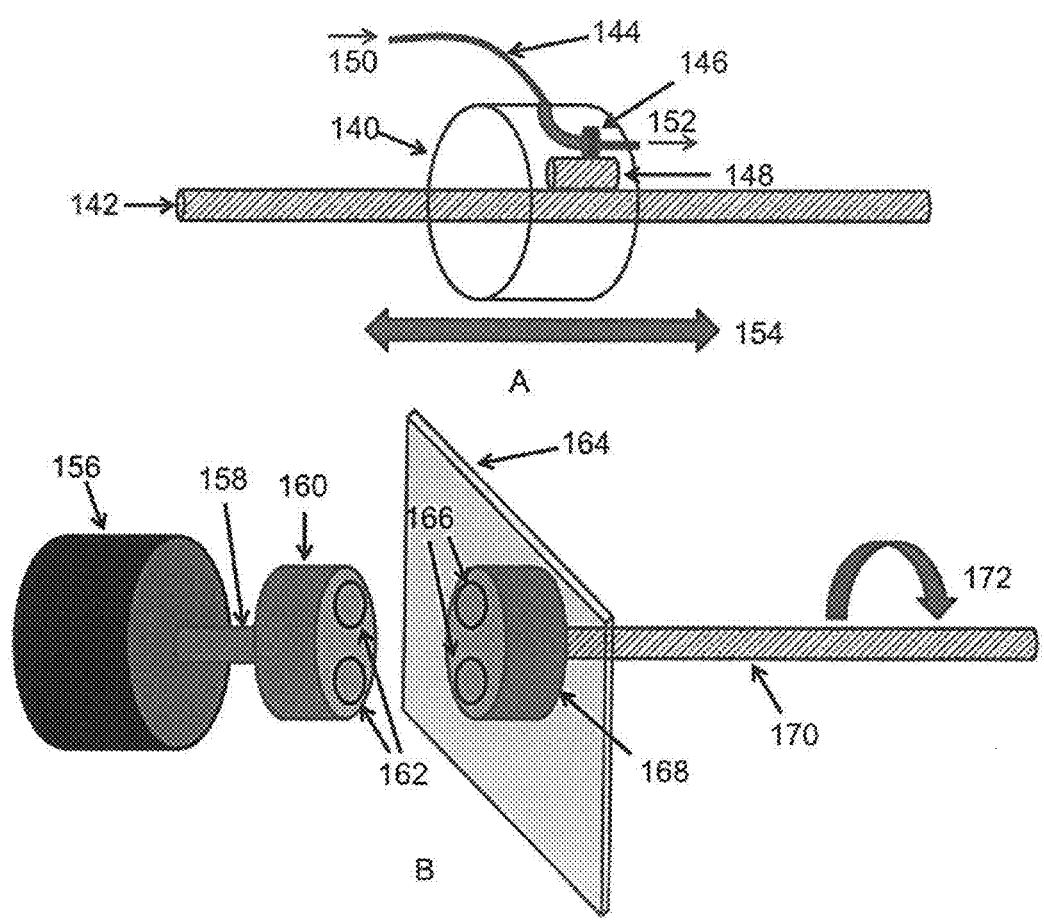
FIG. 5 illustrates an embodiment of alternate mechanisms to drive the three dimensional printing tray into a precise location for deposition of printing material.

FIG. 5 shows an embodiment of alternate mechanisms to drive the three dimensional printing tray or printing platform into a precise location for deposition of printing material.

View 'A' is a side view of an embodiment of an pneumatic actuator 140 which utilizes compressed air 150 through an airline 144 which converts the air pressure to a mechanical motion, utilizing a valve stem or a rotary actuator 146, and driving an internal screw mechanism 148 which is attached to the three-axis framework, which in this embodiment comprises a threaded screw 142. This mechanism allows the pneumatic actuator 140 to move in a forward or backwards direction 154 along the path of the threaded screw 142, or alternatively a track. The waste compressed air is expelled out of outlet 152 and into the three dimensional printer chamber where it is vented by an appropriately sized sterilizing grade vent filter (not shown) which maintains the chamber at ambient pressure.

View 'B' is a side view of a magnetic motor control device which can drive an internal screw to move the three dimensional printer tray. The magnetic motor control device comprises an external motor 156, a shaft 158 and a linkage device 160 containing a plurality of magnets 162. The linkage device 160 connects to a location on a three dimensional printer body wall 164 which can be rigid or flexible. An internal linkage device 168 contains a plurality of magnets 166 which mates with the plurality of magnets 162 of the external linkage device 160. The external motor 156 rotates the external linkage device 160 and magnets 162, and thus, drives the internal magnets 166 and the linkage device 168 which results in a turning motion 172 of an internal threaded screw 170. A friction reducing assembly, such as ball bearings (not shown), can be utilized on the internal and the external linkage devices 160 and 168 to reduce the friction from the drive magnets on the three dimensional printer wall 164. This turning motion 172 of the internal threaded screw 170 allows the three dimensional printing tray or printing platform to move precisely in a forward or reverse direction along rotational axis of the internal threaded screw 170.

Figure 6:
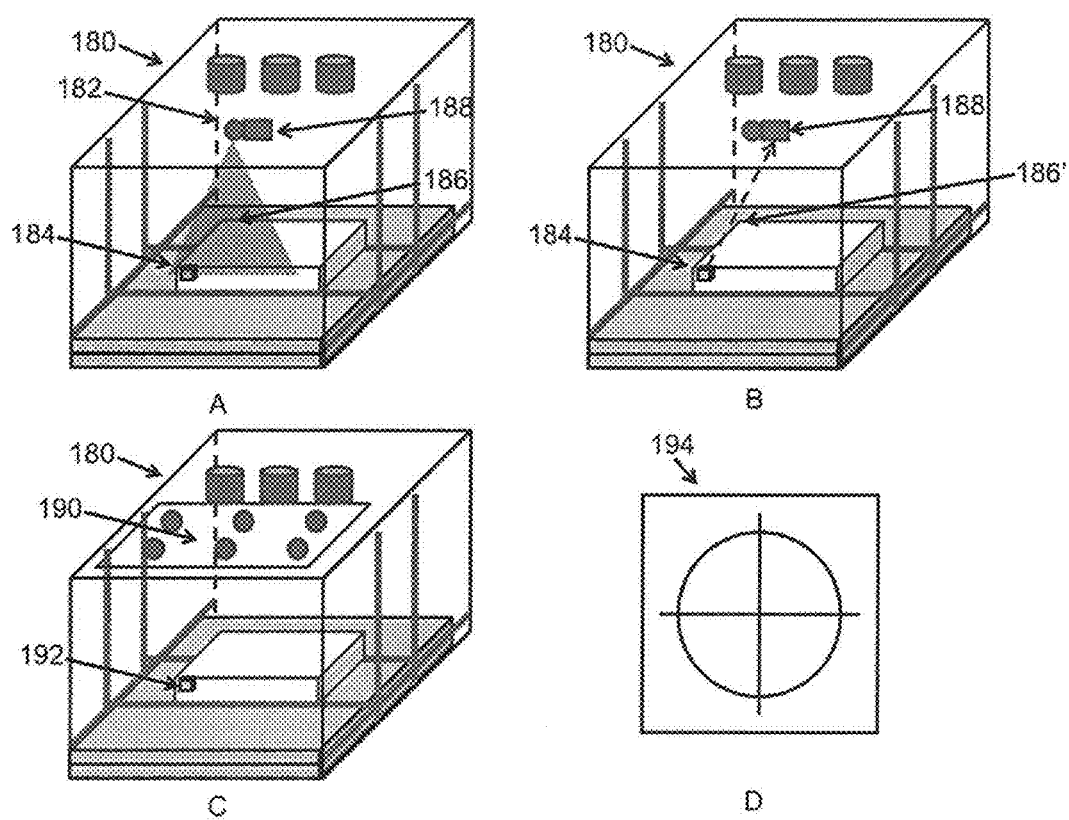
FIG. 6 illustrates an embodiment of a precision tracking system to verify the coordinate location of the tray along the 3 axis framework.

FIG. 6 shows an embodiment of a precision tracking system or position tracking system to verify the coordinate location of the printing platform also called printing tray along the three axis framework. The precision tracking system can additionally be utilized to calibrate the distance between the printing platform or the printing tray and the printer head in use. The precision tracking system can determine the distance and location of multiple points on the printing platform or the printing tray and make the adjustments to level the printing platform in line with the printer head. This function can be performed prior to printing and/or during the printing function.

View 'A' is a front view of a three dimensional printer 180 where a laser emitting device 182 sends out a signal 186 which is reflected by means of a plurality of mirrors 184 located on the printing platform or tray.

View 'B' is a front view of the same three dimensional printer 180, as in view 'A' where a laser detection device 188 detects the angle and time the signal 186' takes to reach the detector giving precise coordinates of the three dimensional printing tray location. This information is relayed to the controller where the printer can precisely deposit material onto the printing tray along the three axis framework.

View 'C' is a front view of a three dimensional printer 180 comprising a camera array 190, wherein the camera array 190 observes a visual target 192 attached to the three dimensional printing platform or formed with the three dimensional printing platform, also called printing tray. The location and size of the visual target 192 can provide precise coordinates of the three dimensional printing tray location which is relayed to the controller where the printer can precisely deposit material onto the printing tray along the three axis framework.

View 'D' is an embodiment of the visual target 194 which is recognized by the camera array 190.

Figure 7:
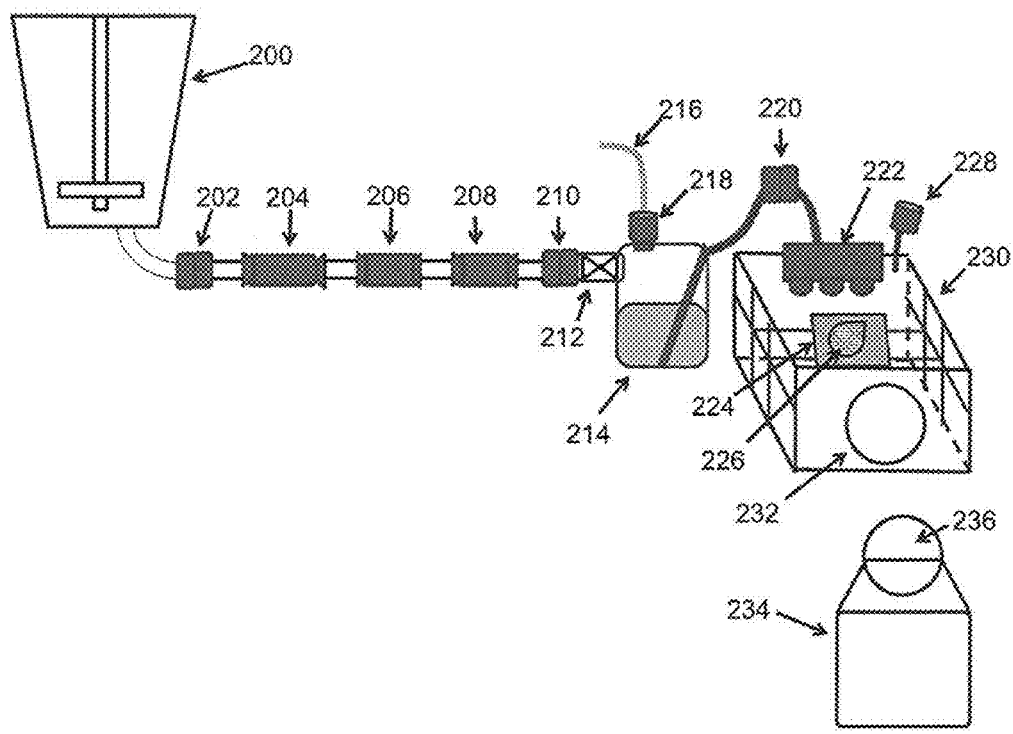
FIG. 7 illustrates an embodiment of a single-use bioreactor and filtration assembly connected to a single-use three dimensional printer via an aseptic connector to form a printed object.

FIG. 7 shows an embodiment of a single-use bioreactor and filtration assembly connected to a single use three dimensional printer via an aseptic connector, wherein the three dimensional printer is capable to form a printed object. This embodiment shows a gamma irradiated assembly containing a single-use bioreactor 200 which is connected to a filtration train via an aseptic connector 202. The filtration train can comprise a plurality of filters including but not limited to a depth filter 204, a pre-filter 206, and a sterilizing grade filter 208.

The filter train is connected to a surge vessel container 214 via an aseptic connector 210. The surge vessel container 214 fills with the material filtered from the bioreactor, which can be driven by a constant pressure or constant flow source. A sterilizing grade vent filter 218 allows the surge vessel container 214 to vent during filling. After the filtration process is complete or the surge vessel container 214 is full the valve 212 to the filter train is closed and a regulated compressed air line 216 is attached to the sterilizing grade air filter 218. The pressure drives the liquid up a dip tube and into a tubing piece which is connected via an aseptic connector 220 to the three dimensional printing assembly 230. The material from the surge vessel container 214 can be concentrated utilizing a cell retention and concentration device, preferably a gamma irradiatable Hydrocyclone (not shown). The processed material can be deposited onto the three dimensional printing tray or printing platform 224 in a precise location through extrusion, spray deposition, or by mixing with a structural component through one or more of the at least one printing head of the printer assembly 222. The three dimensional printed object 226 on the three dimensional printing tray 224 is formed by layer-by-layer additive printing of material from the printer assembly 222. The three dimensional printer 230 vessel, which can be rigid or flexible, is vented by a sterilizing grade vent filter 228. After the printing of the three dimensional printed object 226 has been completed the three dimensional printing tray 224 and printed structure 226 can be removed via a transfer hatch 232 on the three dimensional printer 230 wall. A sterile transfer bag 234 can be connected to the transfer hatch 232 via a sterile connection 236. Thus, the printing tray 224 and three dimensional printed object 226 can be removed from the three dimensional printer 230 while being maintained within a sterile environment.

Figure 8:
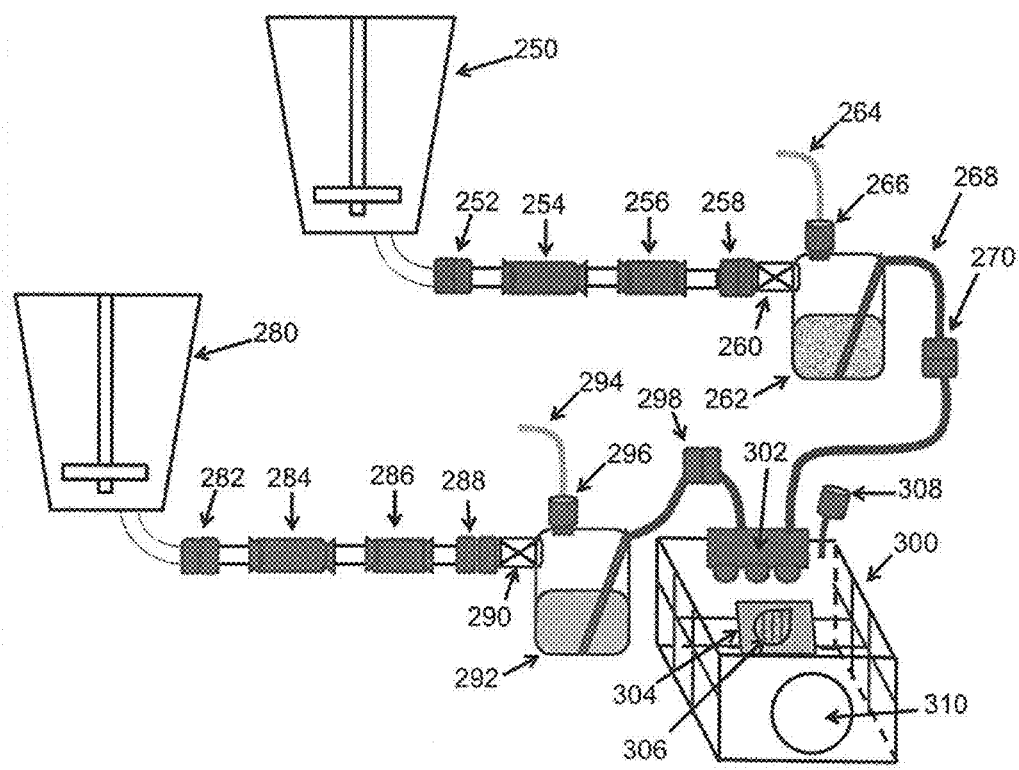
FIG. 8 illustrates an embodiment of two single-use bioreactors and filtration assemblies connected to a single-use three dimensional printer via aseptic connectors to form a printed object.

FIG. 8 shows an embodiment of two single-use bioreactors and filtration assemblies connected to a single-use three dimensional printer via aseptic connectors to form a printed object. This embodiment shows a gamma irradiated assembly containing two single-use bioreactors 250 and 280 which are connected to filtration trains via aseptic connectors 252 and 282. The filtration trains can comprise a plurality of filters including but not limited to pre-filters 254 and 284 and sterilizing grade filters 256 and 286. The filter trains can be connected to a surge vessel container 262 and 292 via aseptic connectors 258 and 288. The surge vessel containers 262 and 292 fill with the material filtered from their respective bioreactors, which can be driven by a constant pressure or constant flow source. Sterilizing grade vent filters 266 and 296 allow for the surge vessel containers 262 and 292 to be vented during filling. After the filtration process is complete or the surge vessel containers 262 and 292 are full, the valves 260 and 290 to the filter trains are closed and regulated compressed air lines 264 and 294 are attached to the sterilizing grade air filters 266 and 296. The pressurized air provided by the air lines 264 and 294 drives the liquid up a dip tube and into a tubing piece which is connected via aseptic connectors 270 and 298 to a single three dimensional printing assembly 300.

The material from the surge vessel containers 262 and 292 can be deposited onto the three dimensional printing tray or printing platform 304 in a precise location through extrusion, spray deposition, or by mixing with a structural component through one or more of the printing heads on the printer assembly 302. The three dimensional printed object 306 on the three dimensional printing tray 304 is formed by layer-by-layer additive printing from material coming from either bioreactor or from both in a specified mixture from the printer assembly 302.

The three dimensional printer 300 vessel, which can be rigid or flexible, is vented by a sterilizing grade vent filter 308. After the printing of the three dimensional printed object 306 has been completed the three dimensional printing tray 304 and printed structure 306 can be removed via a transfer hatch 310 on the three dimensional printer 300 wall.

Figure 9:
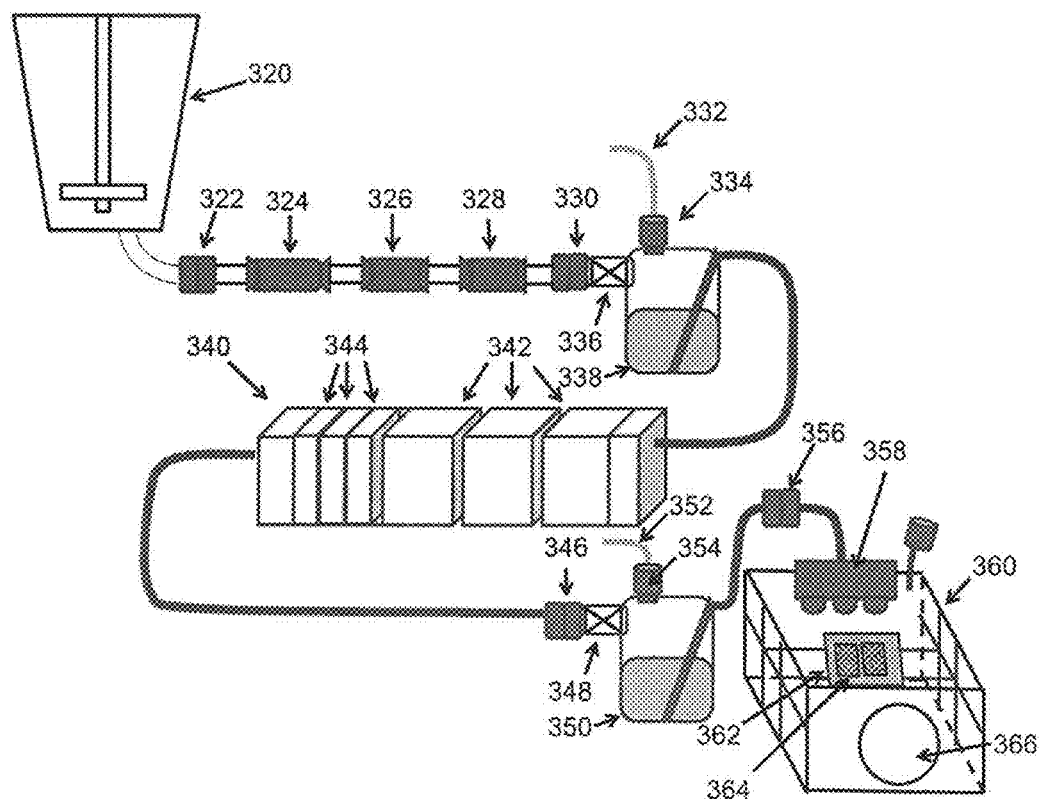
FIG. 9 illustrates an embodiment of a single-use bioreactor, a filtration assembly, and a crossflow assembly connected to a single-use three dimensional printer via an aseptic connector to form a printed object.

FIG. 9 shows an embodiment of a single-use bioreactor, a filtration assembly, and a cross flow assembly connected to a single-use three dimensional printer via an aseptic connector to form a printed object. This embodiment comprises a gamma irradiated assembly containing a single-use bioreactor 320 which is connected to a filtration train via an aseptic connector 322. The filtration train can comprise a plurality of filters including but not limited to a depth filter 324, a pre-filter 326, and a sterilizing grade filter 328. The filter train is connected to a surge vessel container 338 via an aseptic connector 330. The surge vessel container 338 fills with the material filtered from the bioreactor which can be driven by a constant pressure or constant flow source. A sterilizing grade vent filter 334 allows the surge vessel container 338 to vent during filling. After the filtration process is complete or the surge vessel container 338 is full, the valve 336 to the filter train is closed and a regulated compressed air line 332 is connected fluidly with the sterilizing grade air filter 334. The pressure drives the liquid up a dip tube and into a tubing piece which is connected to a pre-sterilized cross flow assembly 340.

The cross flow assembly 340 can comprise a plurality of microfiltration 342 and/or ultrafiltration cassettes 344 in varying sizes. The cross flow assembly is connected to a surge vessel container 350 via an aseptic connector 346. The surge vessel container 350 fills with the material filtered and/or concentrated from the cross flow assembly which can be driven by a constant pressure or constant flow source. A sterilizing grade vent filter 354 allows the surge vessel container 350 to vent during filling. After the cross flow processing is complete or the surge vessel container 350 is full, the valve 348 to the cross flow assembly is closed and a regulated compressed air line 352 is attached to the sterilizing grade air filter 354. The pressure drives the liquid up a dip tube and into a tubing piece which is connected via an aseptic connector 356 to the three dimensional printing assembly 360.

The material from the surge vessel container 350 can be deposited onto the three dimensional printing tray or printing platform 362 in a precise location through extrusion, spray deposition, or by mixing with a structural component through one or more of the printing heads on the printer assembly 358. Prior to gamma irradiation membrane and/or diagnostic strips 364 can be prepositioned onto the three dimensional printing tray 362. The three dimensional printing assembly 358 can spray deposit proteins and/or other concentrated ultra-filtered materials onto the membranes strips for use in diagnostic analysis. Additionally other structural components can be added to the membrane strips by layer-by-layer additive printing of material from the printer assembly 358. After the printing onto the three dimensional printed membrane strips 364 has been completed the three dimensional printing tray 362 and printed membrane strips 364 can be removed via a transfer hatch 366 on the three dimensional printer 360 wall.

Figure 10:
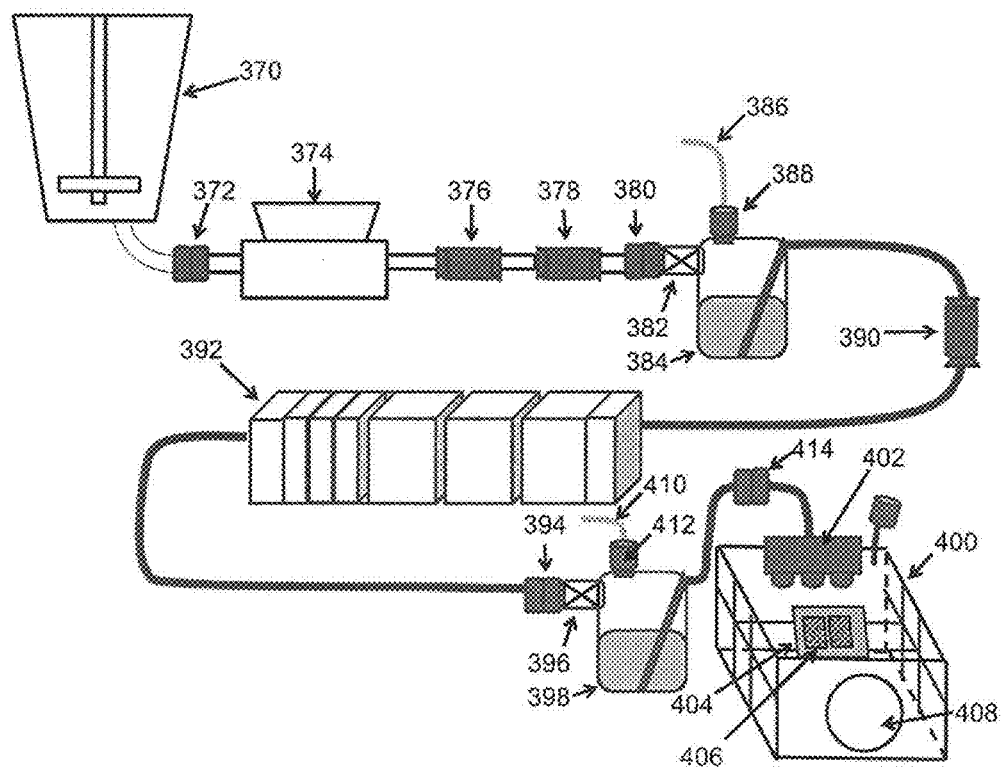
FIG. 10 illustrates an embodiment of a single-use bioreactor, a centrifugation assembly, a filtration assembly, a membrane adsorber assembly, and a crossflow assembly connected to a single-use three dimensional printer via an aseptic connector to form a printed object.

FIG. 10 shows an embodiment of a single-use bioreactor, a centrifugation assembly, a filtration assembly, a membrane adsorber assembly, and a cross flow assembly connected to a single-use three dimensional printer via an aseptic connector to form a printed object. This embodiment comprises a gamma irradiated assembly containing a single-use bioreactor 370 which is connected to a continuous flow centrifuge 374 via an aseptic connector 372. The continuous flow centrifuge removes the heavy particulates from the bioreactor harvest and allows the supernatant to continue into the filtration train assembly. The filtration train can comprise a plurality of filters including but not limited to a depth filter (not shown), a pre-filter 376, and a sterilizing grade filter 378. The filter train is connected to a surge vessel container 384 via an aseptic connector 380. The surge vessel container 384 fills with the material filtered from the bioreactor which can be driven by a constant pressure or constant flow source. A sterilizing grade vent filter 388 allows the surge vessel container 384 to vent during filling. After the filtration process is complete or the surge vessel container 384 is full, the valve 382 to the filter train is closed and a regulated compressed air line 386 is fluidly connected to the sterilizing grade air filter 388. The pressure drives the liquid up a dip tube and into a tubing piece which is connected to a pre-sterilized membrane adsorber 390. The membrane adsorber 390 is a chromatographic membrane carrying functional groups for the reversible binding of biomolecules. The desired molecules can be captured with the membrane adsorber and eluted at a later time or undesirable molecules can be removed by membrane adsorption before further processing. The membrane adsorber 390 can be connected to a pre-sterilized cross flow assembly 392. The cross flow assembly 392 can comprise a plurality of microfiltration and/or ultrafiltration cassettes in varying sizes. The cross flow assembly is connected to a surge vessel container 398 via an aseptic connector 394. The surge vessel container 398 fills with the material filtered and/or concentrated from the cross flow assembly 392 which can be driven by a constant pressure or constant flow source. A sterilizing grade vent filter 412 allows the surge vessel container 398 to vent during filling. After the cross flow processing is complete or the surge vessel container 398 is full, the valve 396 to the cross flow assembly is closed and a regulated compressed air line 410 is attached to the sterilizing grade air filter 412. The pressure drives the liquid up a dip tube and into a tubing piece which is connected via an aseptic connector 414 to the three dimensional printing assembly 400.

The material from the surge vessel container 398 can be deposited onto the three dimensional printing tray or printing platform 404 in a precise location through extrusion, spray deposition, or by mixing with a structural component through one or more of the printing heads on the printer assembly 402. Prior to gamma irradiation membrane and/or diagnostic strips 406 can be pre-positioned onto the three dimensional printing tray 404. The three dimensional printing assembly 402 can spray deposit proteins and/or other concentrated ultra-filtered materials onto the membranes strips for use in diagnostic analysis. Additionally other structural components can be added to the membrane strips by layer-by-layer additive printing of material from the printer assembly 402. After the printing onto the three dimensional printed membrane strips 406 has been completed the three dimensional printing tray 404 and printed membrane strips 406 can be removed via a transfer hatch 408 on the three dimensional printer 400 wall.

Figure 11:
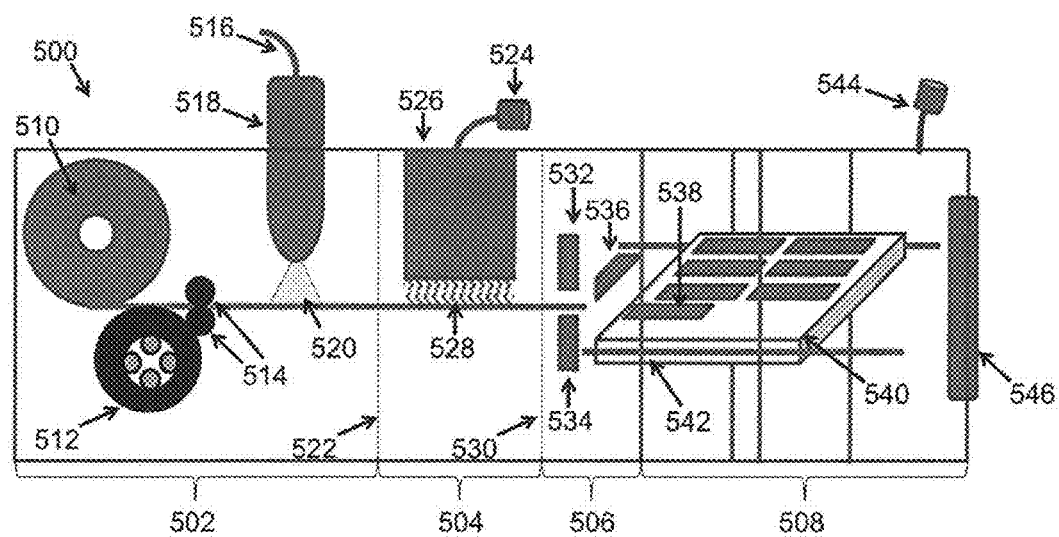
FIG. 11 illustrates an embodiment of a single-use three dimensional membrane printer with a three dimensional axis framework for a stacking/storage tray.

FIG. 11 shows an embodiment of a single-use three dimensional membrane printer with a three dimensional axis framework for a stacking or storage tray. This embodiment shows a gamma irradiated membrane printing assembly 500 containing a membrane dispensing and print section 502 which has a membrane roll 510 suspended by a dowel (not shown). The membrane from the membrane roll 510 is dispensed utilizing a magnetic roller assembly 512 which mates to an external motor with a magnetic head (not shown) to drive the movement of the membrane through the membrane printing assembly 500. The motor speed of the external motor controls the speed at which the magnetic roller assembly 512 moves and at which the membrane is dispensed from the roll 510. An assembly of passive rollers 514 keeps the membrane straight and at tension as the membrane is dispensed. These passive rollers 514 can be present throughout the membrane printing assembly 500 to maintain tension and a straight path for the membrane.

Fluid material, which may be provided by a single-use bioreactor, enters the printer head 518 from the tubing 516 under pressure. The electronically controlled printer head 518 dispenses the fluid 520 onto the membrane with a specific pattern. The magnetic roller assembly 512 can reverse the membrane if multiple passes of fluid and/or structural deposition of material onto the membrane is required for the process. The printed membrane section then moves through an opening in a wall 522 where it enters the drying section of the assembly 504 where the membrane can undergo drying by utilizing heated or cooled sterile air.

A sterilizing grade vent filter 524 can be utilized to bring air that has been heated or cooled from an outside source. The air can enter into the membrane printing assembly 500 through a diffuser block 526, wherein the diffuser block 526 takes the incoming air and diffuses it so that there is an even application of the heated or cooled air 528 across the membrane to allow for even drying. The membrane section then passes through an opening in a wall 530 to a cutting section 506 of the membrane printing assembly 500. Both walls 522 and 530 serve as a physical barrier to prevent the overheating of components within the membrane assembly if heated air is used to dry the printed materials on the membrane.

In a simple embodiment the walls 522 and 530 can be a simple layer of thin plastic. In a more complex embodiment the walls 522 and 530 can contain a thermal insulation to prevent the transfer of heat to other areas of the assembly. In an even more complex embodiment the walls 522 and 530 can contain a capillary network of tubing which can be connected to a cooling or heated water source to prevent thermal transfer and offset the temperature of the air used to dry the printed membrane. The walls of the entire three dimensional printing assembly can also be jacketed to maintain a constant desired temperature.

The cutting section 506 contains at least two movable clamps including one top clamp 532 and one bottom clamp 534. The top clamp 532 and the bottom clamp 534 can clamp down onto the membrane in a specified section preferably one that has not undergone printing and allows for a rigid hold so that the membrane can be cut into sections by a knife cutting assembly 536. A plurality of cutting knives or cutting dies in the knife cutting assembly 536 can cut the membrane into horizontal and/or vertical sections, or die-cut shapes to a specified sizing as required. The knife cutting assembly 536 can feature passive knives under the membrane which cuts the membrane into sized vertical strips as the membrane is fed through it. A horizontal cutting knife can be mechanically actuated to cut the membrane strips at a specific length. The top clamp 532 the bottom clamp 534 and an actuated horizontal cutting knife from the knife cutting assembly 536 can all be driven pneumatically from an external air pressure source or magnetically driven from an external mechanical source. As the membrane is cut by the knife cutting assembly 536 the membrane strips 538 falls into a collection tray or collection device 540 in the membrane strip collection section 508 of the assembly. This collection tray can move along a $_3$ axis framework 542 to stack the membrane strips 538 as they fall into the tray.

In this assembly multiple trays, as preferred collection device, can be utilized along the same three axis framework to increase the area of the membrane strips collected into the trays. The trays can also have a rotatable feature where the internal tray can be rotated along the holding platform to increase the area where the membrane strips 538 can be stacked. In other words the trays may have two linear degrees of freedom and one rotational degree of freedom. The number of trays and the sizing type of trays used can be determined by the size of the membrane roll, the size and the number of strips that need to be cut, and if the printed material on the membrane is sensitive and cannot undergo stacking or can only undergo limited stacking. The entire membrane printing assembly can be maintained at ambient pressure through a sterilizing grade vent filter 544. After the printing process has completed and the membranes strips 538 are placed in the collection trays 540 the trays can be removed through the transfer hatch 546. A sterile transfer bag not shown can be attached to the transfer hatch 546 if the maintenance of sterility is required.

Figure 12:
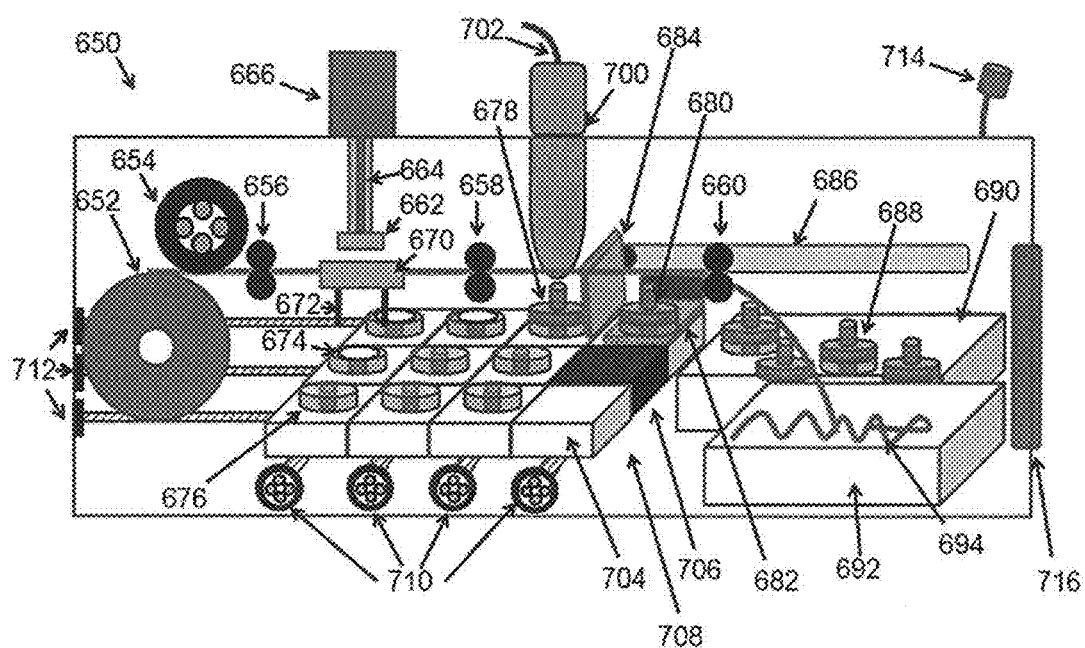
FIG. 12 illustrates an embodiment of a single-use three dimensional printer with a multi-segmented tile printing platform and a membrane dispenser to form a plurality of printed filtration devices.

FIG. 12 illustrates an embodiment of a single-use three dimensional printer with a multi-segmented tile printing platform and a membrane dispenser to form a plurality of printed filtration devices.

This embodiment shows a gamma irradiated filter device printing assembly 650 containing a membrane dispenser which has a membrane roll 652 suspended by a dowel (not shown) and only takes up a portion of the horizontal space within the printing assembly. The membrane from the membrane roll 652 is dispensed utilizing a magnetic roller assembly 654 which mates to an external motor with a magnetic head (not shown) to drive the movement of the membrane through the filter device printing assembly 650. The motor speed of the external motor controls the speed at which the magnetic roller assembly 654 moves and at which the membrane is dispensed from the roll 652. An assembly of passive rollers 656, 658, and 660 keeps the membrane straight and at tension as the membrane is dispensed. These passive rollers 656, 658, and 660 can be present throughout the filter device printing assembly 650 to maintain tension and a straight path for the membrane.

The membrane sheet from membrane roll 652 is spooled out into a holder 670 where a cutting die 662 presses down utilizing the force from an internal shaft 664 from an externally mounted piston 666 to cut through the membrane. This forms a die-cut membrane shape 674 which falls through the holder 670 and maintains placement via guide bars 672. The die-cut membrane 674 is guided to a partially formed filter device 676 which was printed by a three dimensional printer head 700 by layer-by-layer additive printing of a plastic material, preferably polypropylene by a heated extrusion head, but could also be made of Polylactic acid or polylactide (PLA), Acrylonitrile butadiene styrene (ABS), or other printable material which can be fed to the printer head 700 as a spooled material 702, heated and extruded onto the printing platform. The partially formed filter device 676 can include an opening for the fluid to pass through, material to form the body of the filter device, a cavity to fit the die cut membrane 674, and structural material to assist in the building of overhanging structures such as a bridge. Biologic material originating from a bioreactor including proteins, ultra-filtered materials, or other materials can be spray deposited using a separate printer head onto the membrane prior to die-cutting or prior to the completion of the filter device.

After the die-cut membrane 674 is placed on the cavity in the partially formed filter device 676 the individual tiles 704 of the multi-segmented printing platform 708 can be moved utilizing magnetic roller assemblies 710 and 712 which mates to an external motor with a plurality of magnetic heads (not shown) to drive the movement of the individual tiles 704 via a series of rotating screws in a stepwise movement through the filter device printing assembly 650 which mimics a sliding tile puzzle. The multi-segmented printing platform 708 has an empty space 706 which allows for all individual tiles 704 to be moved to all possible positions on the printing platform. The individual tiles 704 containing the partially formed filter devices 676 containing the die-cut membranes 674 are moved in a stepwise movement to the printing head 700 which occupies a portion of the horizontal space not taken up by the membrane dispensing assembly. The printing head 700 then seals the die-cut membrane 674 by extruding material around the rim of the partially formed filter device 676. The printing head 700 then prints the remainder of the filter device by layer-by-layer additive printing to form a completed filter device 678 containing a sealed membrane layer. The completed filter device individual printing platform tile is moved into position in a stepwise movement to enter the completed filter device bin 690. A rigid blade 682 cuts the bottom of the completed filter device 680 to remove it from the printing platform tile. A printed structural element, like a raft, could be utilized to ease the process of removing the completed filter device 680 with a clean break from the rest of the printing platform to reduce any potential defect from the cutting/removal process. A movable guide on a hinge 684 can push the completed filter device into the completed filter device bin 690. This guide can go along the guide path 686 and push completed filter devices 688 throughout the bin 690. The movable guide can be controlled externally by a magnetic motor assembly or an insertable shaft motor (not shown).

The waste components of the membrane roll after being die-cut can be spooled into a membrane waste bin 692 which can collect the remaining membrane 694 and make for easy disposal after the printing process has completed. The entire membrane printing assembly can be maintained at ambient pressure through a sterilizing grade vent filter 714. After the printing process has completed the completed filter devices 688 located in the holding bin 690 can undergo sterile transfer using the transfer hatch 716 if the maintenance of sterility is required.

Figure 13:
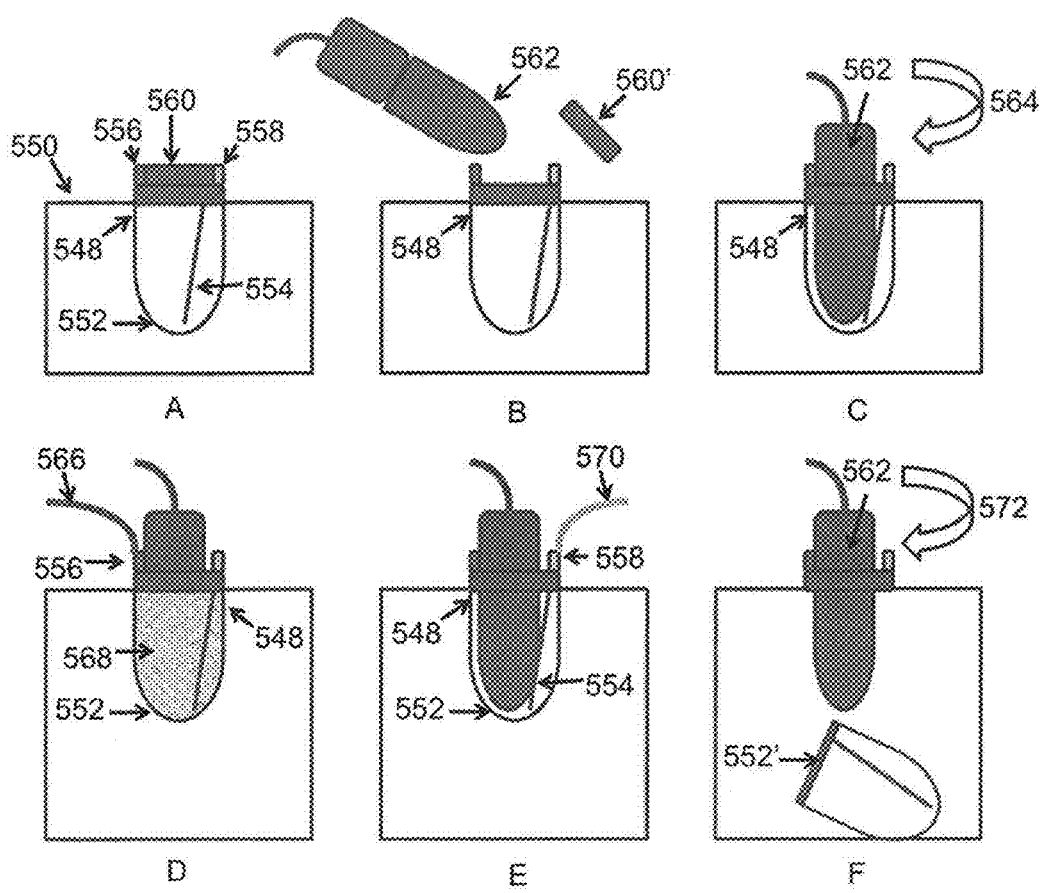
FIG. 13 illustrates an embodiment of the connections steps to insert the printing head into the sterile three dimensional assembly body.

FIG. 13 shows an embodiment of the connections steps to insert the printing head into the sterile three dimensional assembly body.

View 'A' is a side view of an embodiment that shows a gamma irradiated three dimensional printer assembly body 550, with a rigid or flexible wall, containing a printer head insertion assembly 548 containing a cap assembly 552 internal to three dimensional printer assembly with an internal dip tube 554. The external portion of the printer head insertion assembly 548 contains a removable cap 560, a fluid inlet port 556, and a fluid outlet port 558.

View 'B' is a side view of the removable cap 560' being removed from the printer head insertion assembly 548 and the electronically controlled printer head 562 being inserted into the assembly.

View 'C' is a side view of the electronically controlled printer head 562 inserted into the printer head insertion assembly 548 and twisted one position into place 564.

View 'D' is a side view of the printer head insertion assembly 548 with a tubing piece 566 inserted into the fluid inlet port 556 where a chemical sterilant or sanitizer 568 fills the cap assembly 552 sterilizing the internal section of the electronically controlled printer head. The chemical sterilant or sanitizer 568 can comprise a liquid like 30% hydrogen peroxide, or may comprise a gas sterilant such as vaporized hydrogen peroxide or ethylene oxide.

View 'E' is a side view of the printer head insertion assembly 548 with a tubing piece 570 inserted into the fluid outlet port 558 where the chemical sterilant or sanitizer is removed by vacuum pressure after the period of time required to sterilize the printing head is completed. The internal dip tube 554 can be utilized to remove a fluid chemical sterilant or sanitizer or condensate from a gas chemical sterilant.

View 'F' is a side view of the printer head insertion assembly where the printer head is twisted 572 into the second position where the cap assembly 552' drops into the interior of the three dimensional printer assembly body. The cap assembly 552' can be moved manually to a holding bin within the three dimensional printer assembly body by tilting the three dimensional printer assembly until the cap assembly 552' falls into place. The sterilized printer head 562 is ready to print within the three dimensional printed assembly.

Figure 14:
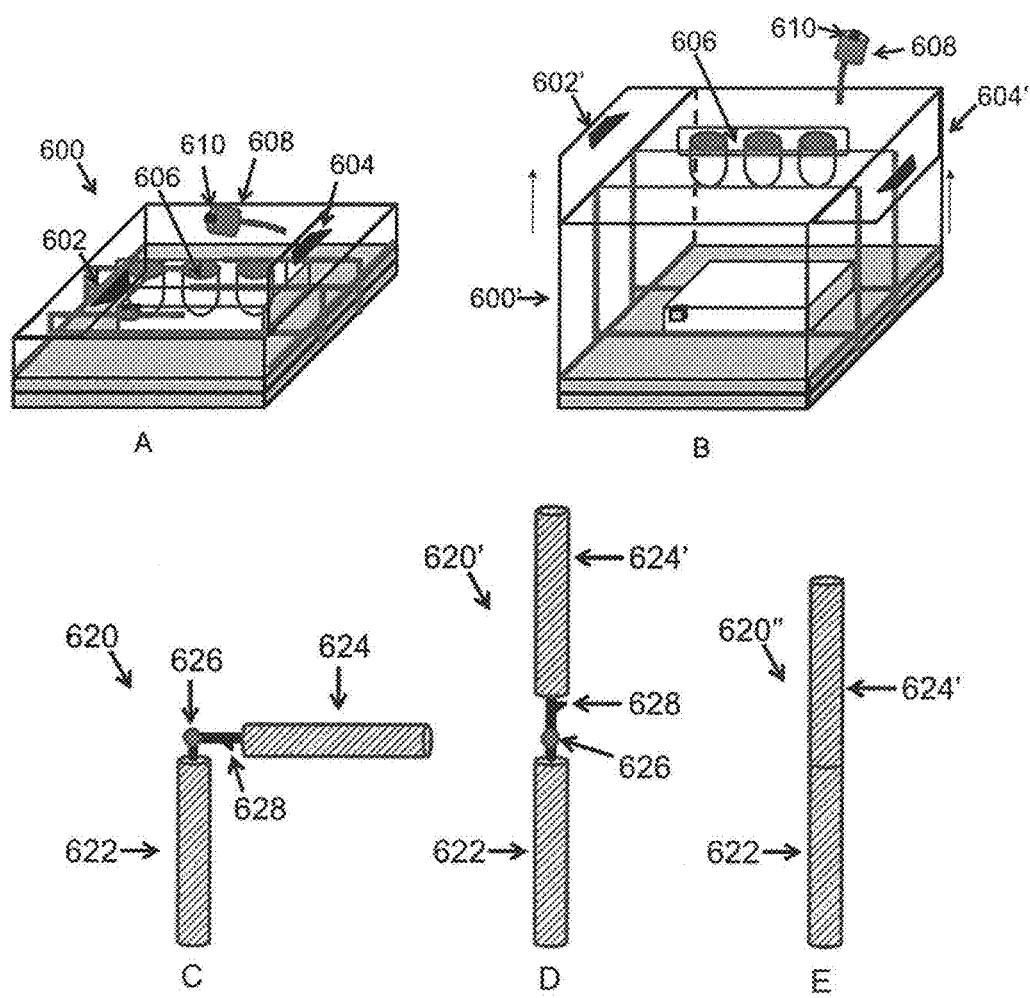
FIG. 14 illustrates an embodiment of the setup process for a flexible wall three dimensional printer from the packed shipping configuration.

FIG. 14 shows an embodiment of the setup process for a flexible wall three dimensional printer from the packed shipping configuration.

View 'A' is a side view of an embodiment that shows a gamma irradiated three dimensional printer assembly 600 with flexible walls that is folded flat in a configuration for shipping. The entire assembly can be enclosed in multiple gamma irradiatable bags for ensuring sterility of the bags when moving from the receiving to the end use facility. The shipping configuration consists of the air bags completely deflated or the actuators and/or magnetic drivers in the minimal position. The bag handles 602 and 604 on the top of the three dimensional printer assembly 600 are folded over. The printer head insertion assembly 606 rest inside of the printing platform tray during shipping. The sterilizing grade venting filter 608 is laid on its side and is capped off with cap 610. A bag integrity testing device, preferably a Sartocheck® automated bag integrity testing unit, can be utilized by inserting the bag assembly between two plates containing a fleece layer to test the integrity of the bag seal and ensure there are no leaks prior to use.

View 'B' is a side view of an embodiment that shows a gamma irradiated three dimensional printer assembly 600' with the handles extended and the operator pulling the handles 602' and 604' upwards. The three dimensional printing assembly bag chamber can be inflated with sterile air from an external source not shown. The folded screws or tracks forming the three axis framework and the internal support skeleton can be manually snapped into place by the operator by pulling up and pushing down on the external handles 602' and 604'. The printer head insertion assembly 606 is supported by an internal crossbar support that can also be snapped into place by the operator. The cap 610 on the venting air filter 608 can be removed after the support skeleton is in place to ensure that the flexible walls do not collapse when vented to the outside.

View 'C' is a side view of an embodiment that shows a threaded screw assembly 620 making up the three axis framework where the printing platform is precisely moved. The threaded screw assembly 620 is in a folded configuration for shipping where the first threaded screw section 622 is separated by the second threaded screw section 624 by a hinge 626 and an internal locking mechanism 628.

View 'D' is a side view of an embodiment that shows a threaded screw assembly 620' which is folded back into a vertical position using hinge 626 by the operator pulling back on the external handles to unfold the bag. The threaded screw assembly 620' is in a folded back where the second threaded screw section 624' is in a vertical position and is in line with the first threaded screw section 622.

View 'E' is a side view of an embodiment that shows a threaded screw assembly 620" where the second threaded screw section 624' is pushed down to mate with the first threaded screw section 622 covering the hinge assembly 626 and the locking mechanism while forming a single threaded screw body 620". The locking mechanism 628 clicks into place ensuring that the threaded screw cannot be detached unless the locking mechanism is disengaged. The operator pulls the external handles down to achieve the locking of the threaded screws for the three axis framework and/or other internal support elements forming the internal support structure for the three dimensional printer assembly.

What is claimed is:

1. A three dimensional printing device comprising:
    a sterilizable printer assembly including
        at least one printing head disposed at a fixed position,
        a printing platform that can be moved along a three axis framework, and
        a driving mechanism including at least one bag or bladder that is extendible in at least one direction and a pneumatic actuator selectively providing a fluid pressure to the inside of the at least one bag or bladder to extend or contract the bag or bladder and thereby to achieve a displacement of the printing platform relative to the at least one fixed printing head along two or three degrees of freedom;
    a printer housing enclosing the printer assembly in a sterile manner,
    at least one aseptic connector fluidly connected to a corresponding one of the at least one printing head.

2. The three dimensional printer of claim 1, wherein the aseptic connector comprises a single-use aseptic connector, where a sterile connection and sterile fluid transfer can occur between at least two connected complementary aseptic connectors or comprises a thermoplastic tubing that can be heat-connected in a sterile manner to a complementary thermoplastic tubing.

3. The three dimensional printer of claim 1, wherein the internal volume of the printer housing is fluidly connected with the exterior by means of a venting filter.

4. The three dimensional printer of claim 3, wherein the venting filter is a sterilizing grade vent filter.

5. The three dimensional printer of claim 1, wherein the degrees of freedom are linear axes, which are orthogonal to each other.

6. The three dimensional printer of claim 1, wherein the at least one printer head is in a fixed position and the printer platform can be moved along a three axis framework.

7. The three dimensional printer of claim 1, wherein the pneumatic actuator comprises a coarse bag and a fine bag, wherein the coarse bag is more extendible in at least one direction than the fine bag, when filled with an identical volume of a fluid.

8. The three dimensional printer of claim 1, further comprising a position tracking system that is capable to determine the position of the printing platform relative to the at least one printing head along each of the three degrees of freedom.

9. The three dimensional printer of claim 8, wherein the position tracking system can be used to automatically calibrate the distance between the printing platform and the printer head in use.

10. The three dimensional printer of claim 8, wherein the tracking system can include a laser tracking system, comprising an external laser source arranged exterior to the three dimensional printer assembly, a mirror or reflective material on at least one portion of the printing platform, a laser detecting device, for detecting the time and angle of the reflected laser emission, and a computing system to calculate and report the coordinates of the printing platform relative to the at least one printing head.

11. The three dimensional printer of claim 8, wherein the tracking system comprises a plurality of cameras exterior to the three dimensional printer assembly, a visual target material on at least one portion of the printing platform, and a computing system to calculate and report the coordinates of the printing platform relative to the at least one printing head.

12. The three dimensional printer of claim 1, comprising a transfer hatch adapted for removing the printing platform containing the three dimensional printed object.

13. The three dimensional printer of claim 12, wherein the transfer hatch is aseptically connectable to a sterile transfer system allowing for the printing platform containing the three dimensional printed object to maintain sterility during transfer of the printed object.

14. The three dimensional printer of claim 13, wherein the sterile transfer system includes a sterile transfer bag allowing for the printing platform containing the three dimensional printed object to maintain sterility during transfer of the printed object.

15. The three dimensional printer of claim 5, further comprising a membrane dispenser for dispensing a roll or sheets of membrane that are printable on by means of the printing assembly.

16. The three dimensional printer of claim 15, wherein the membrane dispenser is pneumatically or magnetically driven.

17. The three dimensional printer of claim 15, further comprising a membrane cutter for cutting the roll or sheets of membrane into strips, sections, shapes, or pieces.

18. The three dimensional printer of claim 17, wherein the membrane cutter is passive utilizing the dispensing of the membrane roll to cut the membrane into strips utilizing a plurality of static blades.

19. The three dimensional printer of claim 17, wherein the membrane cutter is active utilizing a mechanical motion of a plurality of blades to cut the membrane, wherein the blades are driven by a pneumatic actuator or an external magnetic drive mechanism.

20. The three dimensional printer of claim 17, further comprising a collection device for collecting the strips, sections, shapes, or pieces cut from the membrane.

21. The three dimensional printer of claim 20, wherein the collection device is moveable along the three axis framework.

22. The three dimensional printer of claim 1, further comprising a drying device for drying the three dimensional printed object.

23. The three dimensional printer of claim 22, wherein the drying device comprises a dry air vent for providing air from an external air supply device.

24. The three dimensional printer of claim 23, wherein the dry air vent comprises a sterilizing grade vent filter.

25. The three dimensional printer of claim 1, wherein at least a part of the printer housing is formed as a thermal insulation.

26. The three dimensional printer of claim 1, further comprising a temperature regulation device for maintaining a constant temperature within the printer housing.

27. The three dimensional printer of claim 1, wherein the printing platform is formed as a printing tray that is fillable with a nutrient rich liquid, for supplying living cells with an environment for growth during the printing process.

28. The three dimensional printer of claim 27, wherein the liquid in the printing tray undergoes recirculation, filtration to remove debris, and replenishment with new nutrient rich liquid.

29. The three dimensional printer of claim 1, wherein an electric charge is providable by the printing platform or at least one printing head.

30. The three dimensional printer of claim 1, further comprising a leveling device for horizontal leveling of the printing platform.

31. The three dimensional printer of claim 30, wherein the leveling device is usable to automatically calibrate the distance between the printing platform and the printer head in use.

32. A printing system comprising:
a three dimensional printing device having:
a sterilizable printer assembly including
at least one printing head disposed at a fixed position,
a printing platform that can be moved along a three axis framework relative to the at least one printing head, and
a driving mechanism having at least one bladder and a pneumatic actuator for selectively providing a fluid pressure inside the at least one bladder so that the at least one bladder is extendible in at least one direction for displacing the printing platform along two or three degrees of freedom relative to the fixed printing head;
a printer housing enclosing the printer assembly in a sterile manner,
at least one aseptic connector fluidly connected to a corresponding one of the at least one printing head;
at least one sterile bioprocessing container containing a sterile fluid and being fluidly connected with a corresponding one of the at least one aseptic connector; and
a controller for controlling the movement of the printing platform and for controlling the ejection of the sterile fluid onto the printing platform by means of the at least one printing head.

33. The printing system of claim 32, wherein the bioprocessing container is a single use bioreactor.

34. The printing system of claim 32, wherein the at least one printing head comprises a controllable pneumatic source.

35. The printing system of claim 34, wherein the controllable pneumatic source is an automated integrity testing device.

36. The printing system of claim 34, wherein a single controllable pneumatic source is connected to a pneumatic manifold or a pneumatic multiplexer in order to sequentially fluidly connect a single one of a plurality of complementary driving mechanisms to the controllable pneumatic source.

37. The printing system of claim 32, further comprising a position tracking system, which is capable to determine the position of the printing platform relative to the at least one printing head along each of the three degrees of freedom.

38. The printing system of claim 37, wherein the position tracking system is connected to the controller for correcting position of the printing platform to the predetermined coordinates required for the deposition of the printing material by the at least one printing head.

39. The printing system of claim 32, wherein the three dimensional printer further comprises a membrane cutter for cutting the roll or sheets of membrane into strips, sections, shapes, or pieces driven by a pneumatic actuator or an external magnetic drive mechanism controlled by the controller.

40. The printing system of claim 32, wherein the three dimensional printer further comprises a drying device for drying the three dimensional printed object, wherein the drying device includes an air supply device located outside the printer housing providing air through a vent in the printer housing towards the printing platform.

41. The printing system of claim 32, wherein the is part of at least one of a bioreactor, a fermenter, a filtration train, a cross flow assembly, a membrane adsorber, a column, a centrifugation apparatus, a continuous centrifugation apparatus, an incubator, or other bioprocessing assemblies.

42. The printing system of claim 32, wherein the three dimensional printer further can form a filtration device around a cut membrane with layer-by-layer additive manufacturing utilizing a printable material.

43. A printing system, preferably of claim 32, wherein a multi-segmented printing platform can be moved as individual tiles along a three axis gantry within a three dimensional printer.

44. The printing system of claim 43, wherein the individual tile segments can be moved between a plurality of printing heads, membrane dispensers, CNC cutting tools, or other features for the formation of a three dimensional object.

45. A printing method comprising:
providing at least one bioprocessing assembly containing a sterile fluid;
providing a three dimensional printing device having a sterilizable printer assembly including at least one printing head, a printing platform, and a driving mechanism having bladders that can be selectively filled and emptied with fluid to displace the printing platform relative to the at least one printing head along two or three degrees of freedom;
providing a printer housing enclosing the printer assembly in a sterile manner;
depositing a membrane on the printing platform;
aseptically delivering the sterile fluid from the bioprocessing assembly to a corresponding one of the at least one printing head;
moving the printing platform by selectively filling and emptying the bladders of the driving mechanism; and
ejecting sterile fluid by means of the at least one printing head for printing the sterile fluid onto the the membrane located on the printing platform under sterile conditions.

46. The printing method of claim 45 further including the step of sterilizing the printer assembly.

* * * * *